May 26, 1964 R. M. CARSON 3,134,568
TRACTOR SEAT MOUNT

Filed March 22, 1962 2 Sheets-Sheet 1

Raymond M. Carson
INVENTOR.

May 26, 1964 R. M. CARSON 3,134,568
TRACTOR SEAT MOUNT
Filed March 22, 1962 2 Sheets-Sheet 2
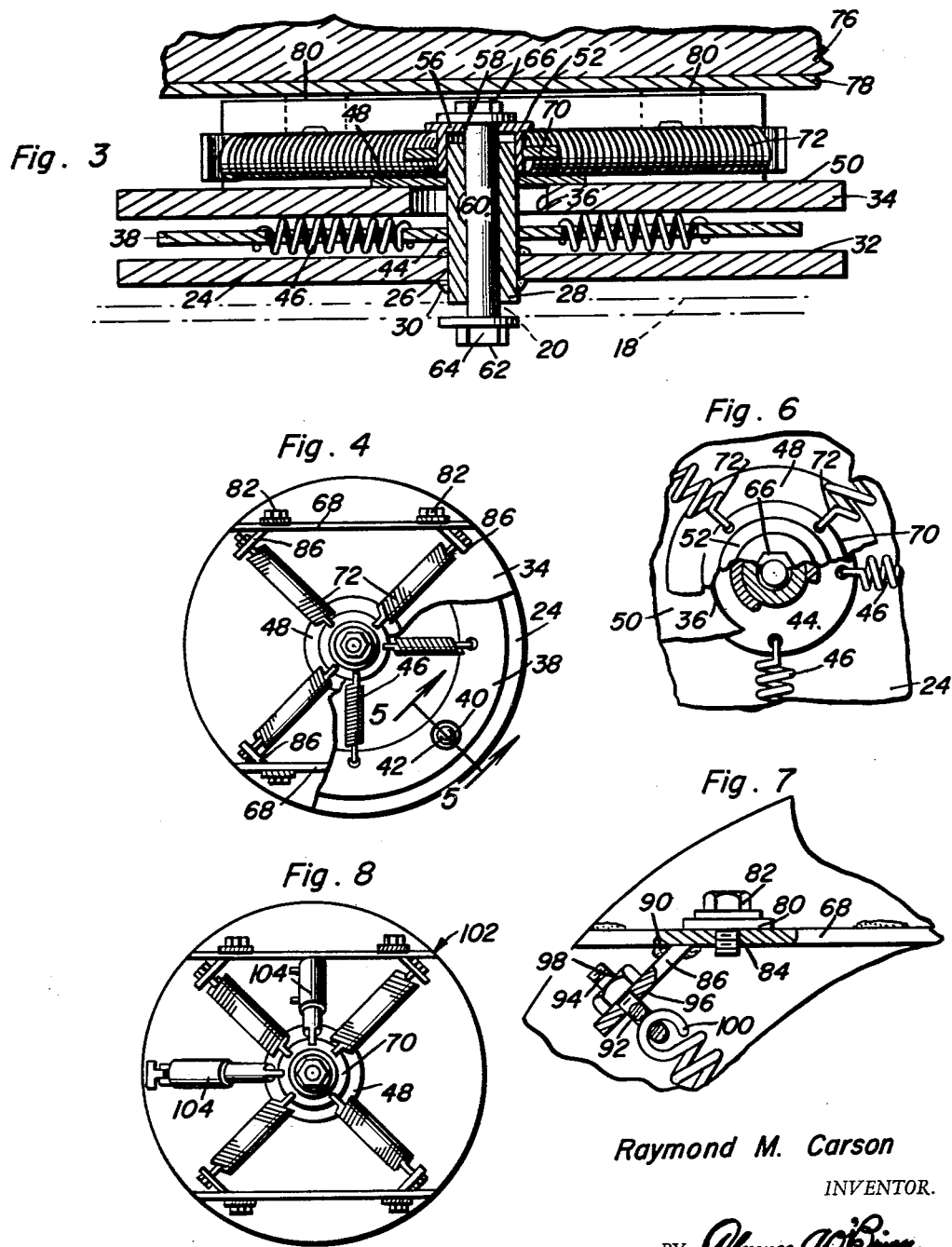
Raymond M. Carson
INVENTOR.

United States Patent Office 3,134,568
Patented May 26, 1964

3,134,568
TRACTOR SEAT MOUNT
Raymond M. Carson, Rte. 1, Faxon, Okla.
Filed Mar. 22, 1962, Ser. No. 181,658
9 Claims. (Cl. 248—425)

This invention relates to a novel and useful tractor seat mount and more specifically to a seat mount which is adapted to be secured to a conventional tractor seat mount or secured to a tractor in place of its conventional seat mount and to have the tractor seat supported therefrom. The tractor seat mount of the instant invention has as its main object the provision of a seat mount which will enable the driver of a tractor to freely swing his seat around in order to lessen the task of visually ascertaining the job being performed by the drive implement towed by the tractor.

Another very important object of this invention, in accordance with the immediately preceding object, is to provide a tractor seat mount for supporting a tractor seat mount on a tractor for limited lateral movement of an upstanding axis in all directions about that axis. In this manner, the sudden shifting of the tractor as it travels over uneven ground will not be transmitted directly to the tractor seat on which the operator is disposed, thus enabling the operator of the tractor to more readily perform the function of operating the tractor.

Another object of this invention is to provide the tractor seat mount with shock absorbing means whereby the shock of excess sudden motion of the seat secured to the tractor seat mount relative to a tractor to which the seat mount is secured may be cushioned.

A final object of this invention to be specifically enumerated herein is to provide a tractor seat mount in accordance with the preceding objects which will conform to conventional forms of manufacture and will be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged transverse vertical sectional view taken substantially upon the plane indicated by section line 3—3 of FIGURE 2;

FIGURE 4 is a top plan view of the tractor seat mount with portions thereof being broken away;

FIGURE 6 is a fragmentary top plan view of the tractor seat mount with portions thereof being broken away and shown in section;

FIGURE 7 is a fragmentary enlarged top plan view of a portion of the tractor seat mount shown with portions thereof being broken away and shown in section; and FIGURE 8 is a top plan view of a modified form of tractor seat mount utilizing a pair of tubular shock absorbers to absorb sudden movement between the seat supported by the mount and the tractor to which the mount is secured.

Figure 1:
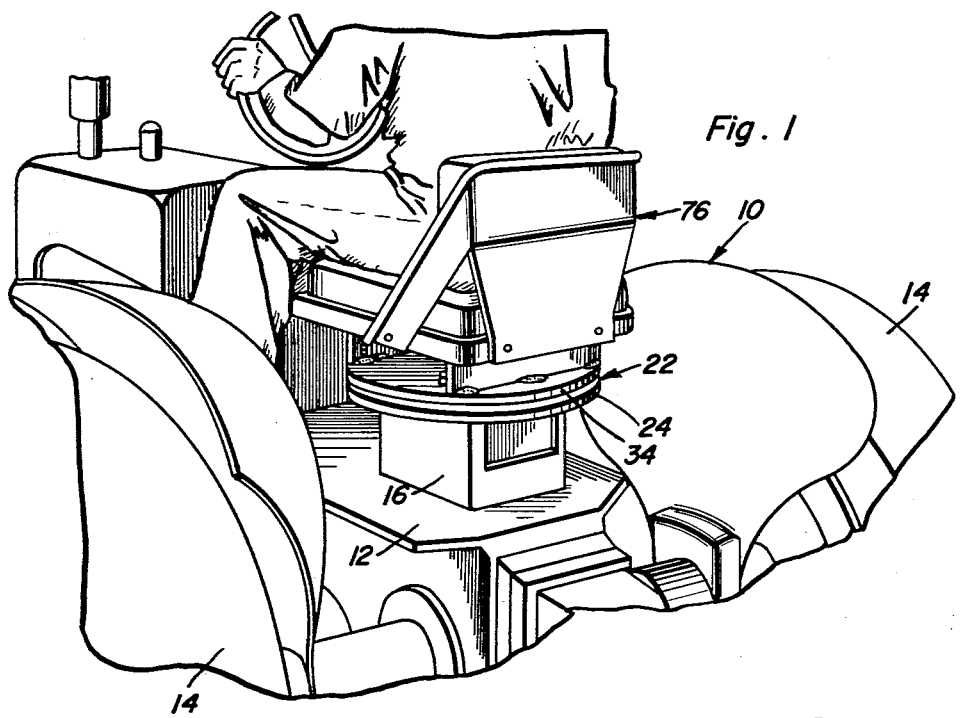
FIGURE 1 is a fragmentary perspective view of a tractor shown with the seat mount of the instant invention being utilized to support a tractor seat from the tractor.

Referring now more specifically to the drawings, the numeral 10 generally designates a conventional type of farm tractor which includes a platform 12 between the rear wheels 14 of the tractor from which the conventional tractor seat mount 16 is supported.

The conventional tractor seat mount 16 comprises a generally hollow housing including a top wall 18, see FIGURE 3, in which an opening or bore 20 is formed. The platform 12 includes portions disposed forwardly of the conventional seat mount 16 and on opposite sides thereof.

The tractor seat mount of the instant invention is generally designated by the reference numeral 22 and includes a generally circular base plate 24. The base plate 24 is provided with a centrally disposed aperture 26 in which the lower end of a sleeve 28 is secured in any convenient manner such as by welding 30. The sleeve 28 projects upwardly beyond the upper surface 32 of the base plate 24 and a seat support plate which is also generally circular in plan and is designated by the reference numeral 34 is disposed in superposed spaced relation to the base plate 24. A large aperture 36 is formed in the center of the seat support plate 34 and the upper end of the sleeve 28 projects through the aperture 36 and is loosely received therein.

Figure 5:
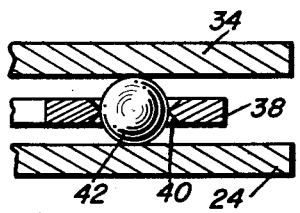
FIGURE 5 is an enlarged fragmentary vertical sectional view taken substantially upon the plane indicated by section line 5—5 of FIGURE 4.
Figure 2:
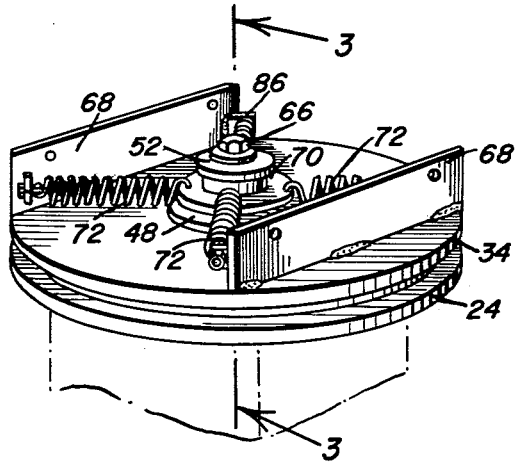
FIGURE 2 is an enlarged perspective view of the tractor seat mount of the instant invention.

A generally annular and plate-like bearing cage 38 is interposed between the base plate 24 and the seat support plate 34 and has a plurality of circumferentially disposed openings 40 formed therethrough in which ball bearing members 42 are loosely received. From FIGURE 5 of the drawings it may be seen that the ball bearing members 42 project from opposite sides of the bearing cage 38 and that the ball bearing members 42 support the seat support plate 34 in spaced relation to the base plate 24.

A washer 44 is disposed about the sleeve 28 between the base plate 24 and the seat support plate 34. The washer 44 rotatably receives the sleeve 28 and has an outer diameter considerably less than the inner diameter of the annular bearing cage 38. A plurality of coil springs 46 are secured between the inner and outer circumferential portions of the bearing cage 38 and the washer 44 and have their longitudinal axes disposed on radii of the sleeve 28. In this manner, the bearing cage 38 is normally resiliently urged toward a position centered with respect to the sleeve 28.

A second washer 48 is disposed about the upper end of the sleeve 28 projecting above the seat support plate 34 and has its undersurface disposed in surface to surface sliding contacting relation with the upper surface 50 of the seat support plate 34.

A sleeve cap 52 rotatably receives the upper terminal end portion of the sleeve 28 and its lower end is disposed in surface to surface engagement with the upper surface of the washer 48. The upper end wall of the sleeve cap 52 is designated by the reference numeral 56 and is provided with a centrally disposed aperture 58 through which the upper end of the shank portion 60 of a fastener 62 projects. The lower end of the shank portion 60 has a head 64 formed thereon and the upper end of the shank portion 60 is externally threaded and has a nut 66 threadedly engaged therewith. From FIGURE 3 of the drawings it will be noted that the head end of the shank 60 is passed through the upper or top wall 18 of the conventional tractor seat mount 16 and in this manner, the base plate 24 and sleeve 28 are rigidly supported from the conventional tractor seat mount 16.

A pair of upstanding walls 68 are secured to the upper surface 50 of the seat supporting plate 34 and a third washer 70 is disposed about the sleeve cap 52. A plurality of coil springs 72 are secured between the outer marginal portions of the third washer 70 and the opposite ends of the upstanding walls 68 thereby normally resiliently urging the seat support plate 34 to a position with the sleeve 28 substantially centered in the aperture 36.

With attention now directed to FIGURES 3 and 7 of the drawings it will be noted that the tractor seat generally designated by the reference numeral 76 includes a base plate 78 from which depends a plurality of apertured mounting lugs 80 which are secured to the walls 68 by means of fasteners 82 secured through threaded apertures 84 formed in the walls 68.

Each of the walls 68 has a pair of apertured mounting lugs 86 secured thereto in any convenient manner such as by welding 90 and an eye member 92 is secure to each apertured mounting lug by means of a shank portion 94 thereof secured through an aperture 96 formed in the corresponding mounting lug 86 by means of a nut 98. The outer ends of the springs 72 are provided with hooked portions 100 which are engaged with the eyes 92.

With attention now directed to FIGURE 8 of the drawings it will be seen a modified form of seat mount generally referred to by the reference numeral 102 which is identical in all respects with the seat mount 22 with the exception that a pair of tubular shock absorbers 104 are secured between the seat support plate 34 and the third washer 70 and disposed at right angles to each other and in a plane generally paralleling the plane of the seat support plate 34.

In operation, as the top wall 18 of the conventional tractor seat mount 16 is moved from side to side and/or fore and aft due to the tractor 10 passing over rough terrain, the seat support plate 34 from which the conventional tractor seat 76 is supported will move laterally of the sleeve 28 between the limits defined by the outer surface of the sleeve 28 and the aperture 36 formed in the seat support plate 34. Additionally, the seat support plate 34 may be rotated relative to the base plate 24 and if desired, the confronting surfaces of the base plate 24 and seat support plate 34 which are substantially planar and parallel may be provided with alignable confronting semi-circular recesses in order to define detent means for yieldably retaining the seat support plate 34 in predetermined positions for rotation relative to the base plate 24.

If it is desired, the plates 24, 34 and the cage 38 may be slightly convexed or concaved so as to further assist in centering the plate 34 and cage 38 relative to the plate 24. Further, the base plate 24 may be secured to a spring seat mount rather than to the rigid seat mount 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tractor seat mount having an upstanding axis, a seat support means adapted to have a seat secured thereto, and means mounting said seat support on said base for limited movement in all directions laterally of said axis and for rotation about an axis generally paralleling said upstanding axis, said seat support and said base being superposed in spaced relation and having confronting faces with at least portions thereof substantially planar and generally parallel, said mounting means including anti-friction bearing means disposed between and in engagement with said planar portions.

2. The combination of claim 1 wherein said support means include means limiting movement of said seat support relative to said base to movement in a single plane extending transversely of said upstanding axis.

3. The combination of claim 1 including means normally resiliently urging said seat support to at least a generally centered position relative to its limits of movement.

4. The combination of claim 1 including shock absorbing means secured between said base and said seat support for absorbing the shock of excess sudden relative movement between said base and said seat support.

5. The combination of claim 1 wherein said anti-friction bearing means comprises a frame-like ball bearing cage having a plurality of ball bearings loosely held captive thereby and projecting from opposite sides of said cage and disposed in rolling contacting relation with said planar portions of said confronting faces.

6. The combination of claim 5 wherein said mounting means also includes a support post secured to said base and projecting toward said seat support, said seat support having an opening formed therein loosely receiving the free end of said post and about which the planar portion of said seat support face is disposed, the sides of said opening defining the limits of movement of said seat support relative to said base.

7. The combination of claim 6 wherein said mounting means also includes resilient means normally resiliently urging said seat support toward a position with said post generally centered in said opening.

8. The combination of claim 1 wherein said anti-friction bearing means comprises a frame-like ball bearing cage having a plurality of ball bearings loosely held captive thereby and projecting from opposite sides of said cage and disposed in rolling contacting relation with said planar portions and said confronting faces, said mounting means also including means mounting said bearing cage for limited movement in all directions laterally of said axis relative to said base.

9. The combination of claim 8 wherein said mounting means also includes means mounting said cage for rotation about an axis generally paralleling said upstanding axis.

References Cited in the file of this patent
UNITED STATES PATENTS

| | | |
|---|---|---|
| 1,682,989 | Smelker | Sept. 4, 1928 |
| 2,131,963 | Mendell | Oct. 4, 1938 |
| 2,552,592 | Rush | May 15, 1951 |
| 2,573,077 | White | Oct. 30, 1951 |